United States Patent [19]
McDougall

[11] Patent Number: 5,370,521
[45] Date of Patent: Dec. 6, 1994

[54] COMPRESSION MOLD WITH VACUUM SEAL

[75] Inventor: Malcolm K. McDougall, Sterling Heights, Mich.

[73] Assignee: The Budd Company, Troy, Mich.

[21] Appl. No.: 128,542

[22] Filed: Sep. 29, 1993

[51] Int. Cl.$^5$ .............................................. B29C 43/56
[52] U.S. Cl. .......................... 425/405.1; 425/DIG. 60; 264/102
[58] Field of Search ...................... 425/388, 405.1, 420, 425/DIG. 60; 264/102

[56] References Cited

U.S. PATENT DOCUMENTS

| | | | |
|---|---|---|---|
| 2,841,823 | 7/1958 | Van Hartesueldt | 425/405.1 |
| 3,840,239 | 10/1974 | Fazekas et al. | 277/235 R |
| 4,551,085 | 11/1985 | Epel et al. | 425/405.1 |
| 4,597,929 | 7/1986 | Blayne | 425/DIG. 60 |
| 4,867,924 | 9/1989 | Schilkey et al. | 425/405.1 |
| 5,130,071 | 7/1992 | Iseler et al. | 425/420 |

FOREIGN PATENT DOCUMENTS 59-79328  5/1984  Japan .

OTHER PUBLICATIONS

Owens Corning Fiberglass paper entitled "Reducing SMC Porosity—Studies Show It Can Be Done", 6 pages.
Gorsuch et al, The General Tire & Rubber Company, "Surface Porosity and Smoothness of SMC, Molding as Affected by Vacuum and Other Molding Variables", 1978, 7 pages.

Primary Examiner—Jay H. Woo
Assistant Examiner—Robert B. Davis
Attorney, Agent, or Firm—Harness, Dickey & Pierce

[57] ABSTRACT

A simple yet reliable sealing assembly for a vacuum compression mold. Molding apparatus for compression molding a charge under vacuum includes an upper die having a molding surface and outer side walls. A lower die has a complimentary molding surface and side walls substantially aligned with the side walls of the upper die. A heat source heats the upper and lower dies. A sealing assembly includes a seal plate on each side wall of the upper die. Upper portions of the seal plates are fixed and sealed to the upper die. Lower portions of the seal plates extend downwardly therefrom. The sealing assembly includes flexible sealing tubes on lower portions of the plates. A distance between upper and lower edges of the seal plates is related to a height of the charge to be molded. A moving device moves the upper die towards the lower die to a partially closed position where the tubes of the sealing assembly engage side walls of the lower die to thereby create a vacuum chamber. A vacuum source creates a vacuum in the vacuum chamber. The dies thereafter are fully closed to cause the charge to flow in the mold cavity defined by the molding surfaces of the upper and lower dies. The apparatus thereby provides the relatively simple and cost effective apparatus for compression molding parts under vacuum.

8 Claims, 2 Drawing Sheets

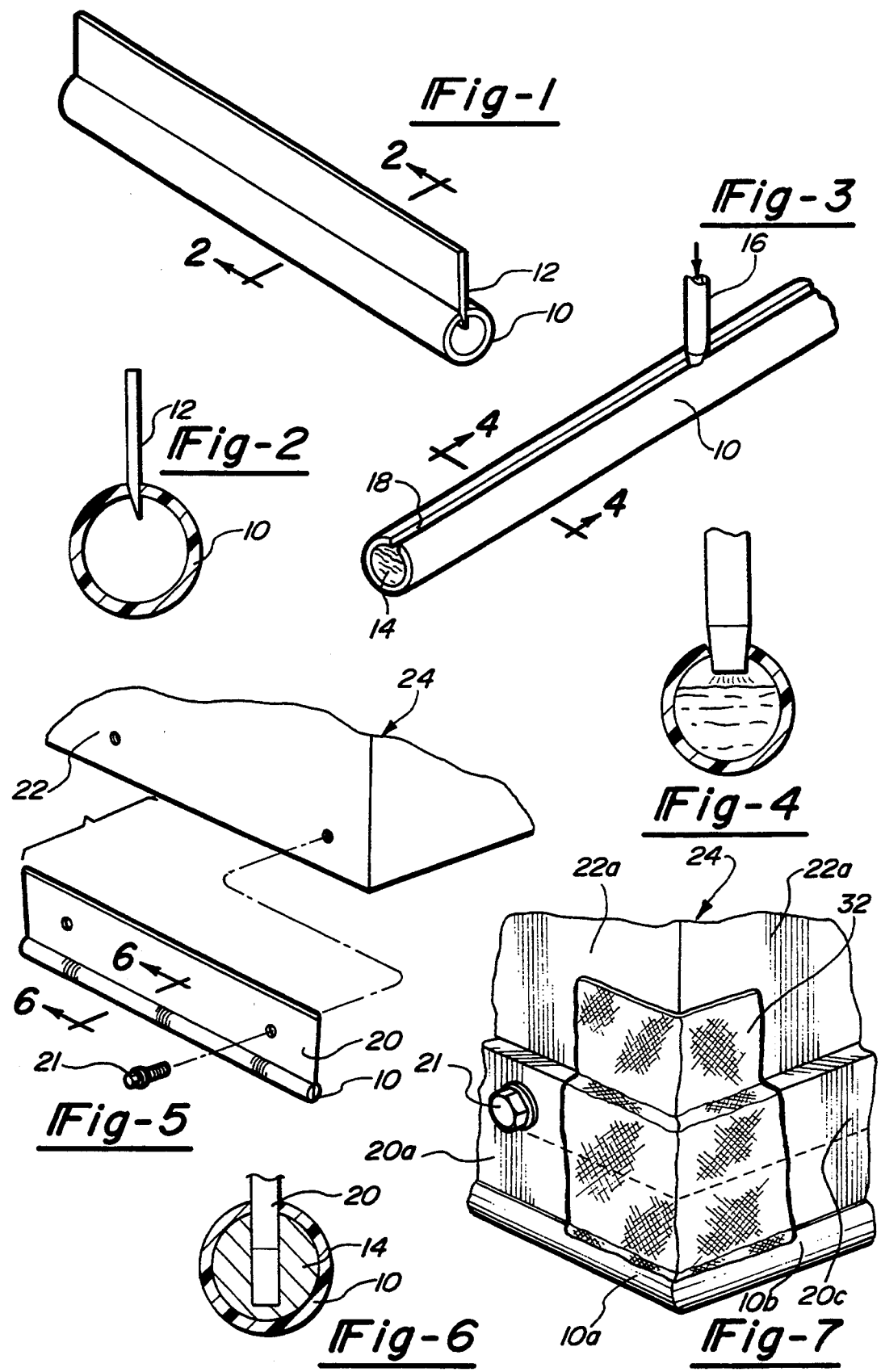

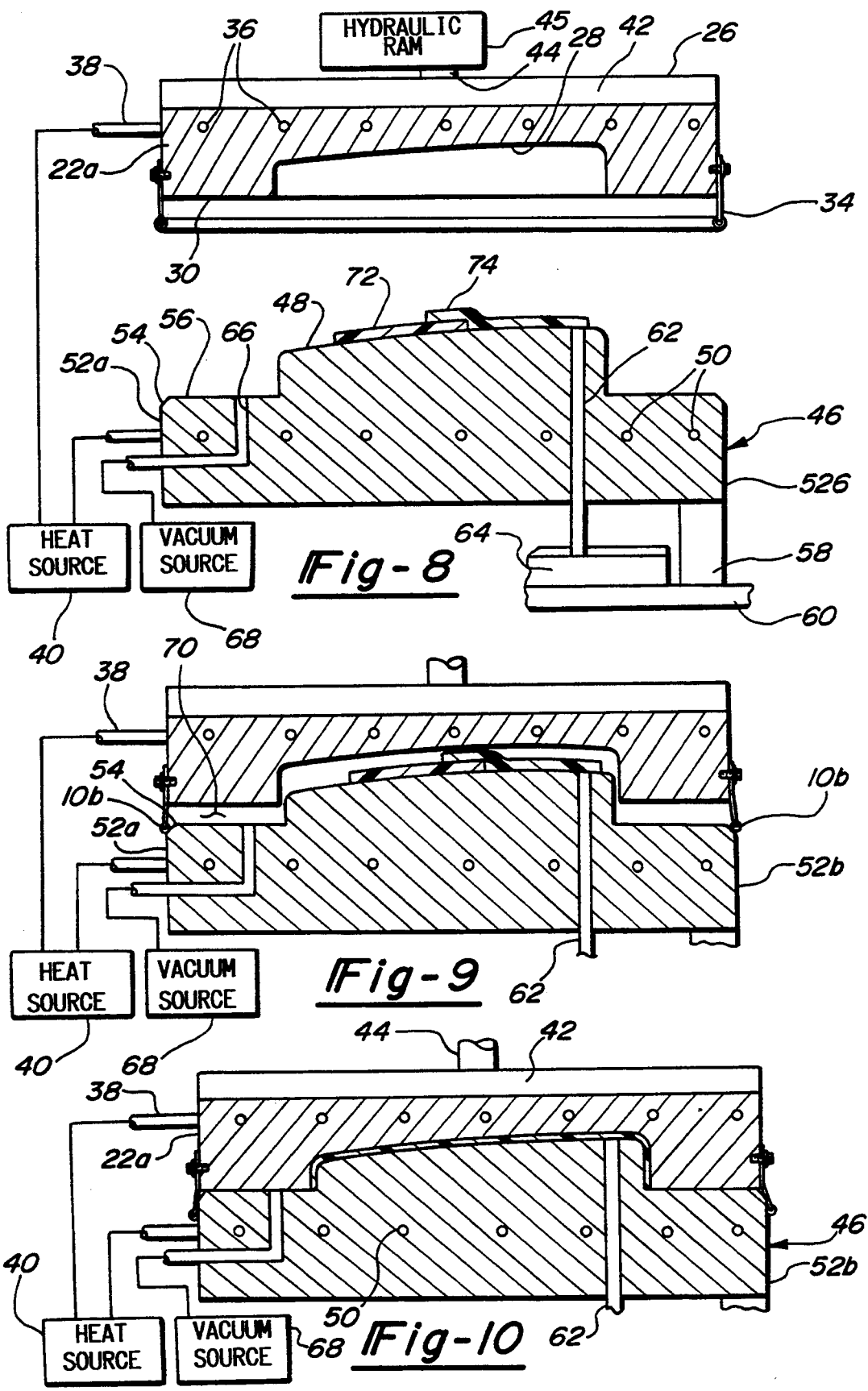

COMPRESSION MOLD WITH VACUUM SEAL

BACKGROUND OF THE INVENTION

1. Technical Field

This invention relates to compression molding equipment and, more particularly, to vacuum molds designed to draw a vacuum during the molding process.

2. Discussion

The use of vacuum during compression molding of parts has become more and more prevalent in the industry. The various advantages of using this technique are documented in the patent literature such as in commonly assigned U.S. Pat. Nos. 4,488,862; 4,551,085; 4,867,924; 4,612,149; 5,130,071 and 4,855,097. Still other mold designs and their purported advantages are disclosed in U.S. Pat. No. 3,840,239 to Fazekas et al, U.S. Pat. No. 4,597,929 to Blayne and in the article entitled "Surface Porosity and Smoothness of SMC Molding As Affected by Vacuum and Other Molding Variables", by J. D. Gorsuch, 33 Annual Technical Conference, 1978, Reinforced Plastic/Composites Institute, the Society of Plastic Industry, Inc.

While the designs in the commonly assigned U.S. patents have, for the most part, performed quite satisfactorily in production, they are, unfortunately, relatively expensive to make. It is also often impractical to refit these molds with new vacuum seals when it is desired to make a prototype part in which only a limited number of parts are to be made.

Another vacuum seal concept employs a vacuum seal arrangement in which a plate is connected to an upper die which engages a resilient seal on a lower die. This mold construction suffers from various disadvantages such as added cost required to grind heavy plates used as seal surfaces. Such mold constructions also require machine shop fitting to coordinate a seal between the upper and lower dies. The resilient seal mounted on the lower die encounters additional wear due to mold flash sticking or adhering to the resilient seal. The resilient seal on the lower die also has sharp corners which must fit tightly with the corresponding sharp corners of the seal plate on the upper die and consequently the resilient seal wears quickly.

Therefore, there exists a need for a lower cost, yet reliable, mold for use in molding prototype parts or in other situations where a limited number of parts are to be made.

SUMMARY OF THE INVENTION

In accordance with the teachings of the present invention, the upper and lower heated dies have sidewalls which are aligned with each other. Flexible metal plates are affixed to the sidewalls of the upper die and include resilient, heat resistant tubes on their lower edges that form a seal against the sidewalls of the lower die. In operation, the upper die is lowered to a partially closed position where the heat resistant tube makes a wiping contact along the sidewalls of the lower die to thereby create a sealed vacuum chamber about the mold cavity. A vacuum is drawn and the upper die continues its downward travel until it compresses the charge to cause it to flow in the mold cavity.

BRIEF DESCRIPTION OF THE DRAWINGS

The various advantages of the present invention will become apparent to one skilled in the art upon reading the following specification and by reference to the drawings in which:

FIG. 1 is a perspective view illustrating the cutting of the resilient tubing to form a slit therein;

FIG. 2 is a cross sectional view taken along the lines 2—2 of FIG. 1;

FIG. 3 is a perspective view illustrating the step of filling the tube with an RTV adhesive;

FIG. 4 is a cross sectional view taken along the lines 4—4 of FIG. 3;

FIG. 5 is a exploded perspective view of an exemplary seal assembly construction and its mounting to the upper die;

FIG. 6 is a cross sectional view taken along the lines 6—6 of FIG. 5;

FIG. 7 is an enlarged perspective view showing a corner of the upper die with the sealing plates attached thereto;

FIG. 8 is a cross sectional view of the mold in an open position;

FIG. 9 is a cross sectional view of the mold in a partially closed position where the seal has defined a vacuum chamber about the mold cavity; and FIG. 10 is a cross sectional view showing the mold in a fully closed position.

BRIEF DESCRIPTION OF THE PREFERRED EMBODIMENT

The molding apparatus of the present invention employs a resilient, heat resistant tube 10. The resiliency characteristics are sufficient to provide an efficient wiping seal against the lower die as the dies are closed during molding, as will appear. The tube 10 also must resist the heat generated by the lower die since it is designed to be in direct contact with it. In the preferred embodiment, tube 10 is made of silicone rubber tubing which is commercially available from Exotic Rubber & Plastic Company. It has an outer diameter of about ½" and an inner diameter of about ⅜".

The preliminary steps in constructing and/or repairing the sealing assembly of this invention is described in FIGS. 1-7. In FIGS. 1 and 2, the tube is shown being slit along its longitudinal axis by a suitable knife blade 12. In FIGS. 3 and 4, the interior of tube 10 is shown being filled with a heat resistant adhesive 14 by way of nozzle 16. Preferably, adhesive 14 is a room temperature vulcanizable (RTV) silicone adhesive which, in addition to being able to withstand high temperatures, also remains flexible when heated so as not to impede the sealing characteristics of tube 10.

As shown in FIGS. 5 and 6, the adhesive filled tube 10 is mounted to a lower edge of flexible metal seal plate 20. This is accomplished by inserting the lower edge of the seal plate 20 into the slot 18 and allowing the adhesive to cure. The seal plate 20 is a thin flexible metal plate which, in this embodiment, is made of a ⅛" thick rectangular sheet of cold rolled steel. Upper portions of the seal plate 20 are bolted via fasteners 21 to lower sidewalls 22 of upper die 24. The upper portions of said seal plate 20 are sealed using adhesive or other suitable means.

Upper die 24 is formed of a generally solid piece of metal such as Kirksite® which has four sidewalls 22(a-d), a generally flat upper surface 26 (FIGS. 8-10), molding surface 28 and generally flat lower stop surfaces 30 surrounding molding surface 28.

Focusing on FIG. 7, the corner construction for the upper die 24 and associated sealing assembly is shown in the most detail. The abutting edges of seal plates 20a and 20c form a joint at a corner which is sealed by way of a resin impregnated cloth patch 32. In the preferred embodiment, cloth patch 32 is made of a woven glass fiber mesh which is impregnated with silicone resin.

The cloth patch 32 is applied to the joint or the corner of the upper die 24 as follows:

A rectangular piece of resin impregnated cloth is cut such that the resin impregnated cloth patch 32 extends laterally approximately 2" onto the adjoining seal plates 20a and 20c and the side walls 22a and 22c. The resin impregnated cloth patch 32 extends down, overlaps the silicon tube 10 by approximately ¼" and is adhered to the lower side walls 22a and 22c and the seal plates 20a and 20c using adhesive. The adhesive can be room temperature vulcanized (RTV) adhesive which also can be used to attach the tube 10 to the seal plate 20. A small wrinkle or pucker is provided in the resin impregnated cloth patch 32 along the joint to allow expansion when the upper die 24 closes on the lower die (described below) resulting in an interference fit.

Each corner of the die is likewise sealed where the edges of the seal plates 20 are abutted. Preferably, the ends of the tubes 10(a–d) are mitered and the joints therebetween sealed by additional RTV adhesive.

Turning now to FIGS. 8–10, the thus formed sealing assembly 34 is illustrated as mounted to upper die 24. The upper die is also provided with a series of bores 36 therethrough. Bores 36 are connected by way of conduit 38 to a suitable heat source 40. Heat source 40, typically, is a source of heated oil or other suitable fluid capable of heating the dies to a temperature of about 290° to 320° F. Upper surface of the die 24 is connected to an upper platen 42 which, in turn, is coupled to a ram 44. A hydraulic ram 45 or other device reciprocally moves the upper die 24 with respect to the lower die 46.

Lower die 46 is similarly constructed of a material that can be machined at relatively low cost. It includes an upper molding surface 48 complementary in shape to molding surface 28 of upper die 24. A similar series of bores 50 are formed in lower die 46 to receive the heating fluid from source 40. Outer sidewalls 52(a–d) are vertically aligned with sidewalls 22(a–d) of upper die 24. Upper corners 54 of the lower die 46 bridging sidewalls 52 and horizontal stop surfaces 56 are radiused to guide the tube 10 as will appear. The upper corner 54 can be radiused about ¼". A lower surface 58 of lower die 46 is connected directly to a lower bolster 58 resting on base 60. A suitable ejector mechanism is provided with a plurality of ejector pins, one of which is shown at 62. Ejector plate 64 is raised and lowered in a manner known in the art.

Lower die 46 also includes a vacuum conduit 66 which is connected to a vacuum source 68 capable of generating the desired level of vacuum.

In operation, a suitable charge such as plies 72, 74 of sheet molding compound (SMC) are laid on the molding surface 48 of lower die 46. The hydraulic ram 45 or other device is activated to lower upper die 24 to the partially closed position shown in FIG. 9. In this position, the tube 10 of the sealing assembly 24 has engaged the heated lower die 46 to form a sealed vacuum chamber 70 surrounding and including the mold cavity which is partially defined. As can be seen in FIG. 9, the radiused upper corners 54 guide the tube outwardly, if necessary, so that it makes a wiping engagement against sidewall 52. The metal seal plate 20 flexes as necessary to accommodate any minor misalignment between the sidewalls of the upper and lower dies. The vacuum source 68 is then energized to provide the desired level of vacuum. Preferably, a vacuum of at least 4" of mercury absolute is created within a period of 10 seconds after the vacuum chamber 70 has been sealed. Further details of the SMC charge, the vacuum system and the advantages that flow from using vacuum assisted compression molding are found in the above mentioned commonly owned patents, which are hereby incorporated by reference.

In FIG. 10, the mold is fully closed. The SMC charge is shown as having flowed throughout the mold cavity to form the part of the desired configuration defined by the complementary molding surfaces of the upper and lower dies. The SMC is heated typically for a period of 30 seconds to 3 minutes until the resin cures. Then, the dies are opened and the ejector pins 62 are utilized to push upwardly on the part and remove it from the lower die.

From the foregoing, those skilled in the art will come to appreciate that the present invention provides a simple, cost effective yet effective design for vacuum compression molding equipment. It is particularly designed for use where a limited number of parts are expected to be made. It has relatively few parts, all of which are easily assembled and repairable.

The molding apparatus of the present invention reduces costs by using small quantities of relatively inexpensive material such as ⅛" cold-rolled sheet metal, ½" outer diameter silicone tubing, and RTV silicone rubber adhesive. In addition, the molding apparatus of the present invention is less labor-intensive than prior molding apparatus. The molding apparatus of the present invention provides an effective seal due to the interference and the flexibility of the seal plates and meets performance objectives of more costly and labor intensive rigid seal systems.

Additional cost savings can be realized after extended use of molding apparatus according to the present invention. When wear or damage due to handling occurs to the molding apparatus of the present invention, the damaged or worn seal tubing and/or corner patches can be easily removed by cutting and/or scraping. The flexible steel plates can be removed and straightened or replaced inexpensively. Reassembly after repair is easily performed. Repairs can be completed quickly, for example, in less than 24 hours after the RTV adhesive has been applied sufficiently.

Despite its simplicity, the design of the present invention provides molded parts with remarkably good surface qualities. Such parts include exterior glass fiber reinforced plastic panels such as automotive panels which have a surface area exceeding one square foot in which it is desired to provide smooth, pit-free surface characteristics approaching that of their stamped steel counterparts.

The molding apparatus of the present invention is easily implemented immediately after manufacturing. Typically, the molding apparatus is fully effective upon the first use without adjusting or rework. Sealing efficiency has been very high due to the flexible side plates pulling inwardly upon application of vacuum unlike rigid molding systems. Depending upon available vacuum from the vacuum source and volume of the mold to be evacuated, a vacuum of 20" to approximately 29" of mercury gauge is readily obtainable.

While this invention has been described in connection with a particular example thereof, no limitation is intended except as defined by the claims that follow.

What is claimed is:

1. Molding apparatus for compression molding a charge under vacuum, said apparatus comprising:
    an upper die having a molding surface and outer sidewalls;
    a lower die having a complementary molding surface and sidewalls substantially aligned with the sidewalls of the upper die;
    means for heating the upper and lower dies;
    a sealing assembly including a seal plate formed from flexible metal sheets on each sidewall of the upper die, upper portions of the seal plates being fixed and sealed to the upper die, with lower portions of the seal plates extending vertically downward from the upper die, and flexible heat resistant sealing tubes on lower portions of the plates, wherein a distance between upper and lower edges of said seal plates is related to a height of said charge to be molded;
    means for moving the upper die towards the lower die to a partially closed position where the tubes of the sealing assembly engage sidewalls of the lower die to thereby create a vacuum chamber; and
    vacuum means for creating a vacuum in the vacuum chamber;
    said dies thereafter being fully closed to cause the charge to flow in the mold cavity defined by the molding surfaces of the upper and lower dies.

2. The apparatus of claim 1 wherein vertical edges of the seal plates are abutted together at corners of the upper die sidewalls thereby creating a joint therebetween, and wherein said molding apparatus further comprises:
    a patch of resin impregnated glass fiber cloth covering each corner to seal the joint.

3. The apparatus of claim 2 wherein said resin impregnated glass fiber cloth covers an upper portion of the flexible sealing tubes adhered to the lower portion of the seal plates.

4. The apparatus of claim 3 wherein each tube includes a slot along its major longitudinal axis, with lower edges of the seal plates being fitted within the slots.

5. The apparatus of claim 4 wherein each tube is filled with an adhesive.

6. The apparatus of claim 5 wherein the adhesive is a room temperature vulcanizable silicone adhesive.

7. The apparatus of claim 6 wherein the plates extend downwardly a sufficient distance so that the tubes engage the sidewalls of the lower die to define a sealed vacuum chamber before the upper die contacts the charge and facilitates molding of the charge into the molded part.

8. Molding apparatus for compression molding a charge under vacuum, said apparatus comprising:
    an upper die having a molding surface, outer side walls, and fluid ports;
    a lower die having a complimentary molding surface, side walls substantially aligned with the side walls of the upper die, and fluid ports;
    means for supplying a heated fluid in the fluid ports of the upper and lower dies to thereby heat the upper and lower dies;
    a sealing assembly including a seal plate on each side wall of the upper die, upper portions of the seal plate being fixed and sealed to the upper die, with lower portions of the seal plates extending downwardly from the upper die, wherein vertical edges of the seal plates are abutted together at corners of the upper die side walls thereby creating a joint therebetween, a patch of resin impregnated glass fiber cloth covering each corner to seal the joint, and flexible sealing tubes on lower portions of the plates, wherein each tube includes an adhesive filled slot along its major longitudinal axis with lower edges of the seal plates being fitted within the slots, and wherein a distance between upper and lower edges of said seal plates is related to a height of said charge to be molded;
    means for moving the upper die towards the lower die to a partially closed position where the tubes of the sealing assembly engage side walls of the lower die to thereby create a vacuum chamber; and
    vacuum means for creating a vacuum in the vacuum chamber;
    said dies thereafter being fully closed to cause the charge to flow in the mold cavity defined by the molding surfaces of the upper and lower dies.

* * * * *